A. C. LA MAY.
CHECKWRITING MACHINE.
APPLICATION FILED JULY 27, 1916.

1,331,934.

Patented Feb. 24, 1920.
4 SHEETS—SHEET 1.

WITNESSES
Magnus H. Johnson

ARTHUR C. LA MAY
INVENTOR.

BY E. H. Cumpston Jr.
HIS ATTORNEY

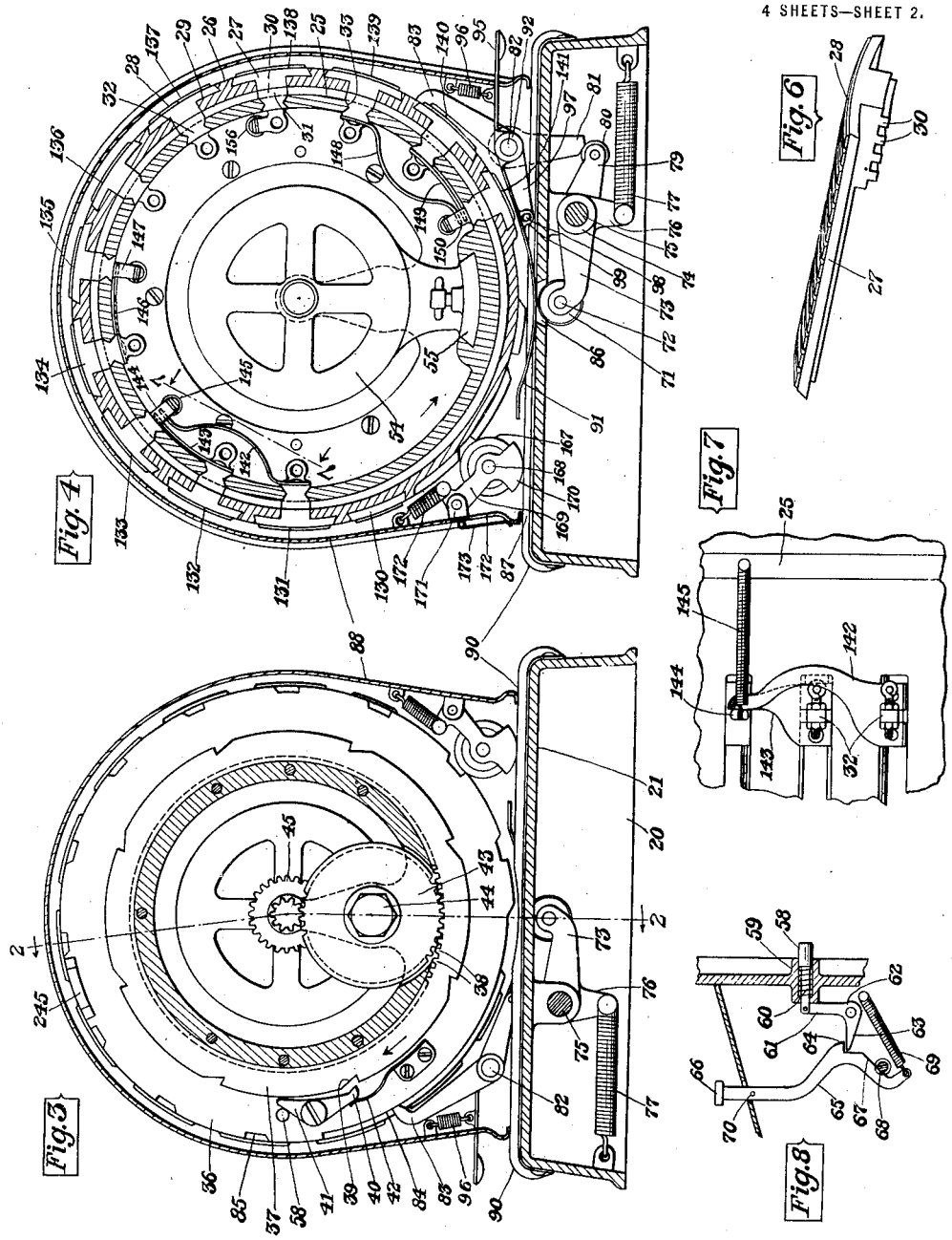

A. C. LA MAY.
CHECKWRITING MACHINE.
APPLICATION FILED JULY 27, 1916.
1,331,934.
Patented Feb. 24, 1920.
4 SHEETS—SHEET 3.
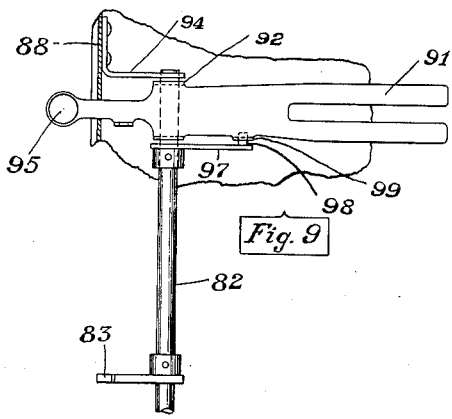
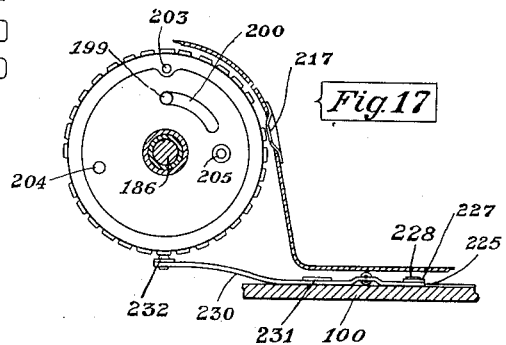
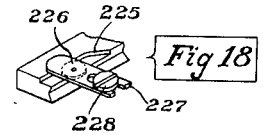
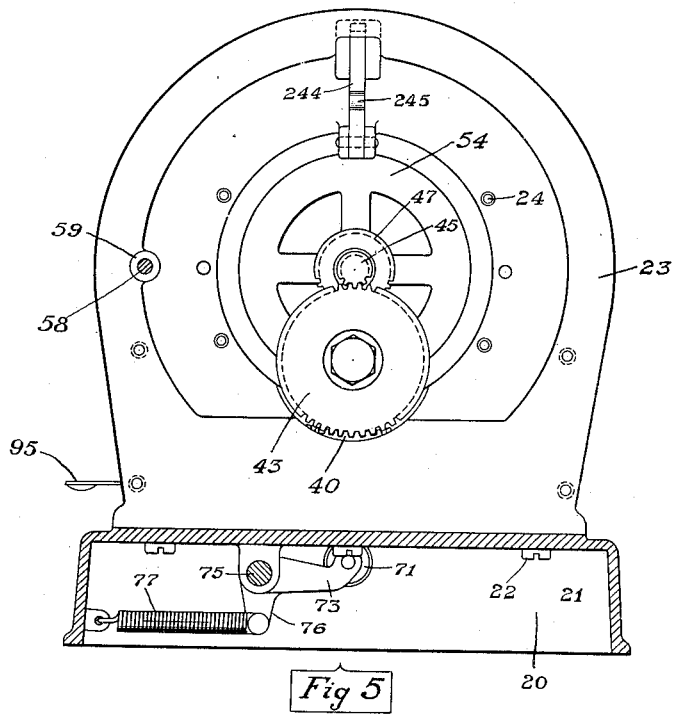
WITNESSES:
Magnus H. Johanson
ARTHUR C. LA MAY
INVENTOR.
BY E H Cumpston Jr
HIS ATTORNEY A. C. LA MAY.
CHECKWRITING MACHINE.
APPLICATION FILED JULY 27, 1916.
1,331,934.
Patented Feb. 24, 1920.
4 SHEETS—SHEET 4.
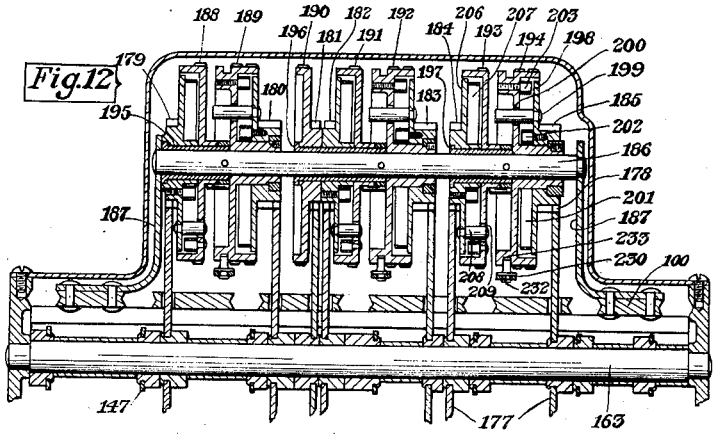
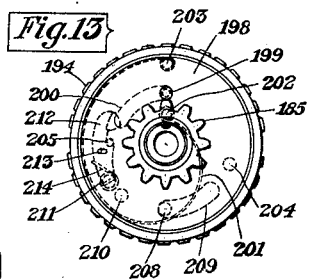
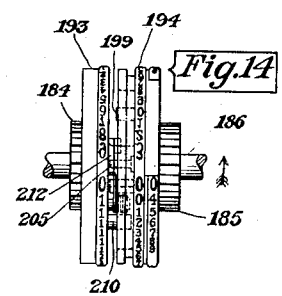
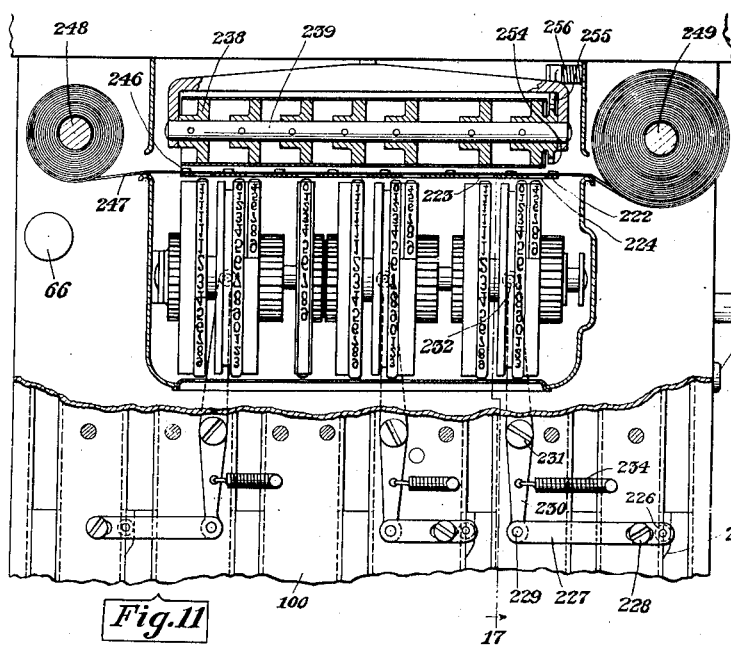
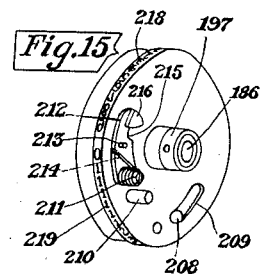
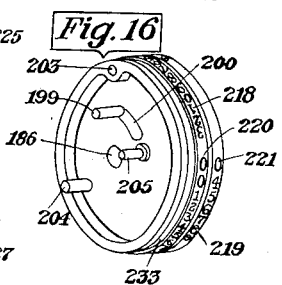
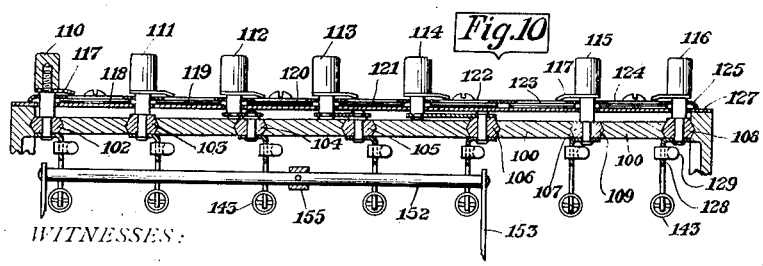
ARTHUR C. LA MAY
INVENTOR.
WITNESSES:
BY
HIS ATTORNEY

UNITED STATES PATENT OFFICE.

ARTHUR C. LA MAY, OF ROCHESTER, NEW YORK, ASSIGNOR TO TODD PROTECTOGRAPH COMPANY, OF ROCHESTER, NEW YORK, A CORPORATION OF NEW YORK.

CHECKWRITING-MACHINE.

1,331,934. Specification of Letters Patent. Patented Feb. 24, 1920.

Application filed July 27, 1916. Serial No. 111,743.

*To all whom it may concern:*

Be it known that I, ARTHUR C. LA MAY, of Rochester, in the county of Monroe and State of New York, have invented certain new and useful Improvements in Checkwriting-Machines; and I do hereby declare the following to be a full, clear, and exact description of the same, such as will enable any person skilled in the art to which the invention appertains to make and use the same.

The present invention relates to printing machines and more particularly to machines of this class which are supplied with a range of type forms adapted to be used in selected combinations for marking the work with different inscriptions, such, for instance, as numerical amounts. This invention is especially useful where it is desired to print upon a check, or similar instrument, the monetary value for which it is drawn, in order to prevent fraudulent alteration of the instrument, and the machine may be employed for this purpose either to express the value in figures, or to express it completely in words alone, the latter form obviously affording more protection against alteration.

One of the objects of the invention is the provision of a machine of this type which is simple and reliable in construction, and convenient and efficient in operation.

Another object is the provision of a machine of this sort capable of rapid operation, especially where there are a number of checks to be written for the same amount, as in the case of pay roll checks. To this end the machine is so constructed that the type for printing the whole amount may first be selected by a convenient mechanism, and subsequently impressed by a single operation, so that any number of checks for the same amount may be quickly written from the same set-up of type by a single printing operation for each check.

Another object of the invention is the provision of a machine adapted to make automatically a printed record of the amount of each check written.

Another object is the provision of a mechanism in which the printing of an amount expressed in words operates automatically to make a printed record of the same amount expressed in numerals.

Another object is the provision of a conveniently arranged and controlled machine of this type having a power driven motor for operating it.

These and other objects and advantages will more clearly appear from the following detailed description of one embodiment of the invention illustrated in the accompanying drawings, in which:—

Fig. 3 is a sectional elevation taken on the line 3—3 of Fig. 2.

Fig. 4 is a sectional elevation taken on the line 4—4 of Fig. 2.

Fig. 5 is a sectional elevation taken on the line 5—5 of Fig. 2.

Fig. 6 is an enlarged perspective view of one of the type supporting members, or slides.

Fig. 7 is a detail view of actuating connections between different slides as viewed substantially from the line 7—7 of Fig. 4.

Fig. 8 is a sectional view in elevation of the means for connecting the type carrier with its actuating mechanism.

Fig. 9 is a detail view of the presser foot for retaining the work against inadvertent movement on the printing bed, and also for guarding the work against contact with the inked type forms.

Fig. 10 is a sectional elevation of a portion of the type selecting mechanism taken substantially on the line 10—10 of Fig. 2.

Fig. 11 is a sectional plan view of the recording mechanism taken on the line 11—11 of Fig. 2.

Fig. 12 is a sectional elevation of a portion of the recording mechanism taken on the line 12—12 of Fig. 2.

Fig. 13 is a side elevation of a pair of the die carrying wheels of the recording mechanism.

Fig. 14 is an elevation of the same, but showing the wheels as seen front the front of the machine.

Figs. 15 and 16 are perspective views of the same wheels, separated, showing the devices for actuating one wheel from the other.

Fig. 17 is a sectional elevation on the line 17—17 of Fig. 11, showing, principally, the device for shifting certain of the recording wheels in an axial direction.

Fig. 18 is a perspective view of a portion of the same device showing the actuating cam shoulders on certain of the slides of the selecting mechanism.

Figure 1:
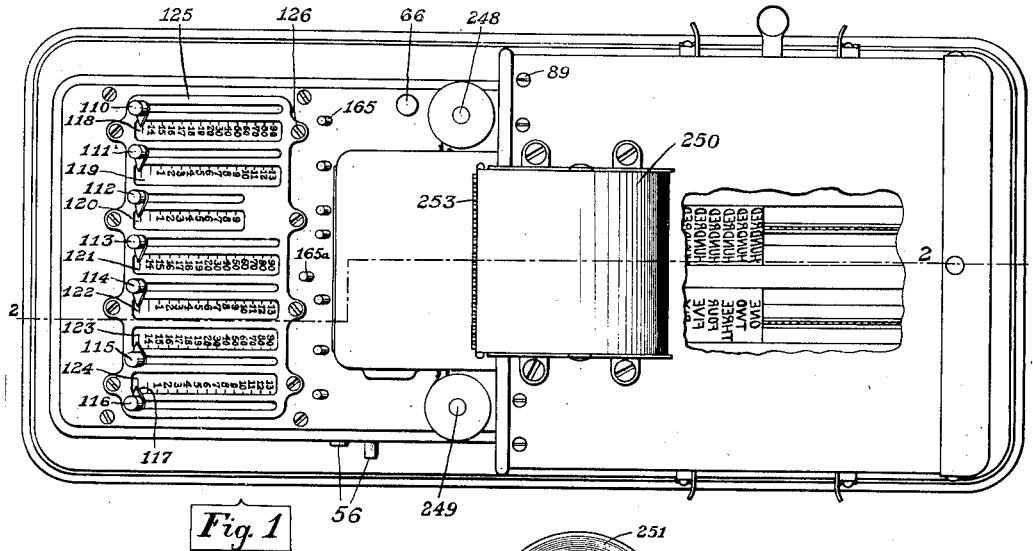
Figure 1 is a top plan view of the machine.

*Check writing machine type carrier.*—The present invention is embodied in a check writing machine involving some of the features disclosed in U. S. Letters Patent No. 1138330 to Todd and Tiefel, the machine of the present invention however having a rotary type carrier and a rotary platen, with a selective mechanism for bringing a plurality of type forms for printing the whole amount of the check into position on the carrier for coöperation with the platen, so that by a single rotation of the carrier the whole amount may be printed and the check fed through the machine by the rolling contact of the type forms and platen. To this end there is provided, preferably, a supporting frame having a base portion 20 supporting a printing bed 21 over which the work is fed during the printing operation. Secured to this bed by screws 22, near its center, (Fig. 2) is a vertical frame 23, best illustrated in Fig. 5. Secured to the back of the frame by means of screws 24, is a stationary cylindrical support 25 extending to the rear of the machine. Surrounding this support 25 and rotatably mounted thereon, is a type carrier 26, preferably in the form of a sleeve, and provided with elongated slots or guideways in which are carried the type supporting bars or members 27. These members have a dovetailed fit with the slots in the carrier, so that while they may be moved longitudinally on the carrier they are supported firmly and accurately in position. Fixed in a column, or row, on each of these members, and in spaced relation longitudinally thereof, are a plurality of type forms 28 extending laterally of the members and circumferentially of the carrier. These type forms represent words expressing various amounts and denominations and other useful symbols, and are adapted to be combined for writing any monetary sum or value within the limits of the machine, as will be more fully explained. As shown in Fig. 1, the words indicating amounts are of various lengths and the type forms of each member are arranged with their terminations in alinement with each other in a direction parallel with the axis of the carrier. As will be seen by reference to Figs. 2 and 4, each of the type supporting members 27 is preferably provided at its rear end with a plurality of ribs 30 projecting inwardly toward the axis of the carrier and extending parallel with the plane of rotation of the latter. Accurately interfitting with these ribs are similar ribs 31 on the outer surfaces of a plurality of blocks, or clutches, 32, carried by the support 25. These clutches have a tongue and groove engagement in slots 33 extending longitudinally in the support 25, there being one clutch centrally below each of the members 27 in position to coöperate therewith as described. Each of the clutches 32 may be moved along its slot parallel with the axis of the carrier, and by means of the coöperating ribs described is adapted for shifting the corresponding member 27 axially of the carrier to bring its type forms selectively to a common printing position in a plane perpendicular to the axis of the carrier near its longitudinal center, as will be presently described.

The sliding movement of the type supporting members 27 longitudinally of the carrier, in the manner described, serves to bring into alinement with each other circumferentially of the carrier and in printing position, any selected combination of type forms for writing the amount of a check. After this selective adjustment the carrier 26 is rotated on the support 25 through a complete revolution to move the selected type forms in succession into engagement with the work. The clutches 32 being carried by the stationary support do not revolve, and therefore each of the type supporting members 27 passes out of engagement with its clutch at the beginning of each printing rotation of the carrier, and is returned to engagement therewith when the carrier is returned to initial position. It is desirable to provide means for locking the type members 27 in adjusted position while out of contact with their respective clutches 32 during the rotation of the carrier, and to this end the support 25 is preferably provided on its outer periphery with parallel circumferentially extending ribs 34 corresponding with those on the blocks 32. As the carrier is revolved the ribs 30 on each of the type members engage the ribs 34 on the support which thus act to maintain the members in their adjusted positions. When the carrier is rotated back to initial position each member is brought back into engagement with its respective clutch for subsequent actuation thereby.

*Type carrier actuating mechanism.*—The type carrier 26 is preferably secured at its forward end by means of screws 35 (Fig. 2) to a ring 36 rotatably supported on a bearing at the forward end of the support 25. Also rotatably carried on the forward end of the support 25, between the latter and the frame 23, is an annular gear 37 having internal teeth 38 by means of which it is constantly rotated through gearing presently to be described. The gear 37 is preferably provided on its external circumference with a plurality of notches 39 (Fig. 3) with which is adapted to engage the point 40 of a pawl 41 which is pivotally carried on the adjacent surface of the ring 36. A spring 42 on the ring 36 urges the point of the pawl 41 toward the gear 37 for engagement in the notches thereon, but the point of the pawl is normally held out of engagement with these notches by means of a pin 58 which engages with the tail of the pawl. A controlling means later to be described, operates to withdraw this pin from engagement with the pawl so that the latter is moved by its spring into engagement with the notches of the constantly rotating gear 37, by which means the ring 36 and gear 37 are clutched together so that the ring 36 and the type carrier fixed thereto are rotated with the gear through a complete revolution, when the pawl 41, returning to initial position, has its tail brought into engagement with the pin 58, so that the pawl is moved out of engagement with the gear and the gear and the type carrier are thus disconnected. The engagement of the pawl with the pin 58, in the manner described, serves to arrest the movement of the type carrier so that it is brought to rest in its initial position, it being understood that the pin 58 during this operation is withdrawn to release the pawl and start the rotation of the type carrier, and is then immediately replaced in order to withdraw the pawl and arrest the type carrier at the end of one complete revolution.

The actuating gearing by which the gear 37 is rotated comprises a gear 43 (Figs. 2 and 3) journaled on a stud 44 fixed in the support 25. Meshing with the gear 43 is a pinion 45 fixed on a shaft 46 also journaled in the support 25 and having fixed thereon a gear 47. Meshing with the latter gear is a pinion 48 journaled on a stud 49 fixed in the support 25 and having integral therewith a gear 50 meshing with a pinion 51 fixed on a sleeve 52 which is rotatably carried on the end of the shaft 46. The sleeve 52 has a slotted end with which is engaged a pin carried in the shaft 53 of a motor 54, preferably an electric motor. The motor has a base 55 fixed on the bottom of the support 25, the motor being thus located in the interior of the support 25 where it is protected and occupies otherwise unavailable space. As the machine requires very little power for operation, the motor may be very small and is connected and disconnected from a source of power in any convenient manner, as indicated by the usual push buttons 56, shown in Fig. 1 as mounted on the side of a portion 57 of the machine casing, which portion serves generally as an operating board for the machine.

Figure 2:
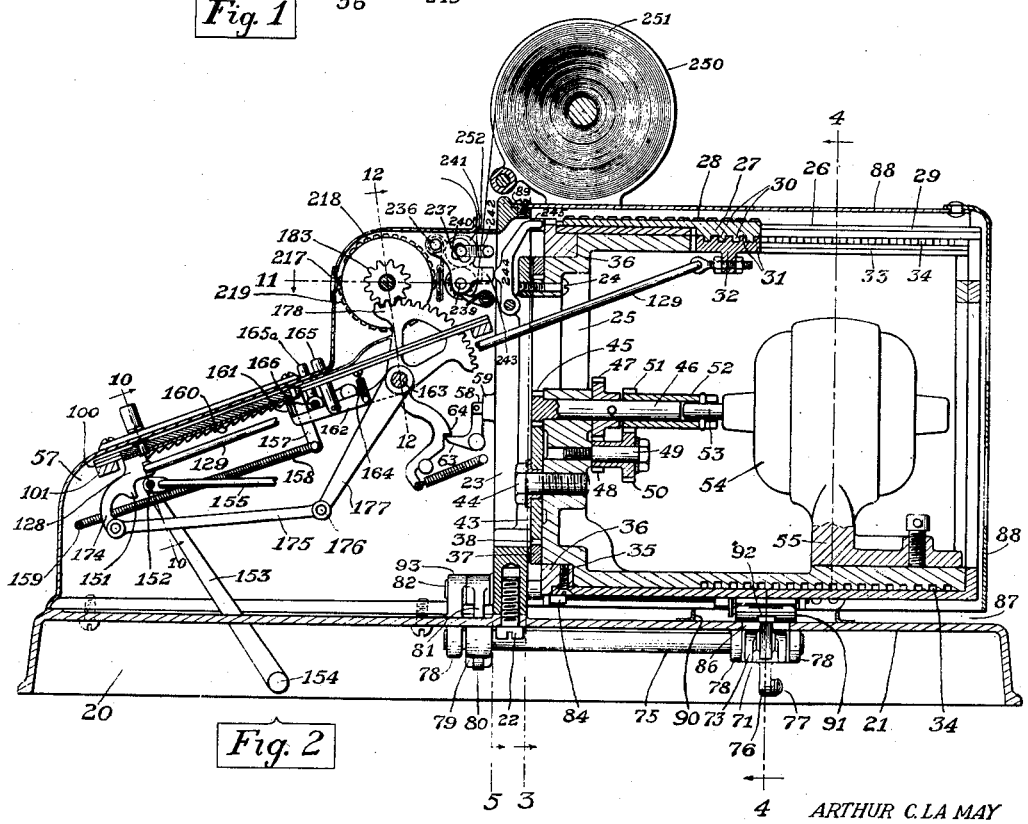
Fig. 2 is a sectional elevation of the machine taken on the line 2—2 of Fig. 1.

*Type carrier control device.*—The means for controlling the rotation of the type carrier to print a check comprises preferably a pin 58, previously referred to, for releasing and withdrawing the pawl 41 which connects the type carrier with its actuating mechanism. Pin 58 is slidably mounted in a boss 59 in the frame 23 (Figs. 2, 5 and 8).

A spring 60 within the boss serves to urge the pin into position for engagement with the tail of the pawl. The other end of the pin has pivotally connected therewith one arm 61 of a bell-crank lever 62 rotatably supported on the side wall of the operating board 57 and having an arm 63 projecting forwardly beneath a lug 64 on a plunger 65 which extends upwardly above the operating board 57, and carries at its upper end a finger piece, or button, 66. The lower end of the plunger has an inclined cam surface 67 adapted to slidably engage with a pin 68 fixed on the casing of the machine. A spring 69 attached to the lower end of the plunger and to the casing serves to hold the plunger raised, and with its lug 64 above the arm 63 of the bell-crank lever 62, a pin 70 in the plunger engaging the under side of the operating board 57, serving to limit the upward movement of the plunger. By depressing the plunger, as will be understood, the lug 64, engaging the arm 63 of the bell-crank lever, serves through the parts described to withdraw the pin 58 out of engagement with the pawl 41, the cam surface on the plunger operating thereafter to carry the latter forwardly at its bottom so that it immediately passes out of engagement with the bell-crank lever, allowing the latter and the pin 58 to return to initial position. When the plunger is released it is raised by its spring 69 and the lug 64 snaps back into position above the forward end of the arm 63 of the bell-crank lever. It will now be clear that each time the plunger 66 is depressed the type carrier is connected with its actuating gearing so that it is given a complete revolution and is then stopped in initial position.

*Platen mechanism.*—The platen mechanism comprises, preferably, a rotary platen wheel shown at 71, below the printing bed, directly under the type carrier and substantially opposite the longitudinal center of the latter, and this wheel is shown as having is surface formed with fine corrugations extending circumferentially of the wheel. The surfaces of the type forms are provided with similar corrugations extending longitudinally thereof, and the corrugations on the platen and type are arranged to intermesh, or register, with each other during the printing impression for the purpose of disrupting the paper while the ink is being applied so that the paper will thoroughly absorb the ink, as set forth in the patent to Todd and Tiefel referred to above, and in the patent to Todd, No. 793,249, granted June 27, 1905, for printing apparatus. The platen is rotatably carried on trunnions 72 journaled in the forked ends of a lever 73 (Figs. 2 and 4). Lever 73 has a bearing 74 on a shaft 75 extending longitudinally of the machine, and the platen lever 73 has fixed thereto a downwardly extending arm 76 to which is attached one end of a spring 77, the other end of which is fixed to the base, the spring tending to lower, or retract, the platen to inactive position. Shaft 75 is journaled in lugs 78 depending from the printing bed and the shaft carries at its forward end a substantially horizontal arm 79 in the forked end of which is journaled a roller 80. In position to engage the roller 80 from above, is the beveled end of a downwardly extending arm 81 fixed on a shaft 82 which extends longitudinally of the machine above the printing bed. Shaft 82 has fixed thereto an upwardly extending arm 83 (Figs. 3, 4 and 9) the upper end of which is adapted to wipe over the outline of a cam surface 84 formed by the periphery of the ring 36 fixed to the type carrier. As best seen in Fig. 3, the cam 84 is provided with a plurality of depressions 85 each having one end inclined and the other end extending radially inward from the periphery of the cam. One of these depressions 84 is provided for each of the type supporting members and so located relatively thereto that as the common line of termination of the type forms on any one of the members passes the platen, the arm 83 drops suddenly into the corresponding depression and allows the platen to be lowered by the spring 77 out of engagement with the work. The opposite end of the depression coming in contact with the arm 83 raises the platen in time for engagement with the succeeding type form.

As previously explained, the type and platen, engaging the work therebetween, serve by their rolling coöperation to feed the work simultaneously with the impression of the characters thereon. It will be understood that the serrated printing faces of the type and platen, in addition to preparing the papers for absorption of the ink, have, in this connection, the additional function of assisting the feeding operation by firmly gripping the paper. As the type form passes out of contact with the platen the feeding action ceases except that the engagement of the serrations with the paper operates to impart a small additional feeding movement thereto at the end of each word which serves to form a space between adjacent words. In order to prevent this spacing feed from being excessive, it is preferable to lower the platen as the termination of each word reaches it in the manner explained above. This principle of operation and the coöperating action of the corrugated surfaces of the type and platen whereby the paper is disrupted and also fed to properly space the impressions is fully explained in the patent to Todd and Tiefel previously referred to, so that a more detailed description thereof herein will be unnecessary.

*Work guiding means.*—An opening 86 (Figs. 2 and 4) is provided in the printing bed through which the platen is raised into engagement with the work, which is supported on the printing bed and fed thereacross through a slot 87 between the bed and a casing 88 which incloses the type carrier and is supported by means of screws 89 on the frame 23. A pair of guide flanges 90 are provided on the printing bed, one on either side of the platen, and spaced from each other a sufficient distance to receive between them the check or other work to be printed. These guides are shown in the present instance as fixed to the printing bed to receive a standard size of work, but it is obvious that the guides may be made adjustable on the bed to receive different sizes of work if so desired.

A combined guard and stripper for the work is provided, preferably, in the curved and slotted plate 91 (Figs. 4 and 9) which is supported above the printing bed and arranged to bear resiliently upon the work to hold it against inadvertent movement. The slot with which the guard is formed is a little wider than the face of the platen, so as to allow the latter to press the work a slight distance through the slot for engagement with the type forms. The guard plate is provided with downturned ears 92 rotatably mounted on the shaft 82 previously described, this shaft being rotatably supported by means of a bracket 94 fixed on the casing 88 (Fig. 9) and also a bracket 93 (Fig. 2) extending upwardly from the printing bed. The guard is provided with an operating finger piece 95 extending through a slot in the casing (Fig. 4) and a spring 96 is attached at one end to the finger piece 95 and at the other end to the casing 88 so as to press the guard against the work on the printing bed. By means of the finger piece, however, the guard may be raised out of contact with the bed so as to permit the convenient insertion and removal of the work. It is desired to have the guard operate also as a means for stripping the work from the type and to this end, preferably, the shaft 82 has fixed thereon an arm 97 (Figs. 4 and 9) carrying at its end a pin 98 engaging in a slot in an ear 99 turned downwardly from the guard 91. It will be understood from the construction described that the pin and slot connection between the guard plate 91 and the arm 97 permits the guard to be raised independently by means of the finger piece 95 for the insertion and removal of the work and that during the printing operation the rocking movement imparted to the shaft 82 first raises the platen to press the work a slight distance through the slot in the guard and above the latter in position to engage the type forms, and that thereafter during the continued upward movement of the platen the arm 97 engages and raises the guard so that the latter approaches the type together with the platen but does not quite come into contact with the type. When the platen is allowed to drop after each printing impression, spring 96 urges the guard downwardly with the platen and thus strips the work from the type and holds it against the printing bed. The pressure of the guard against the work also serves to prevent excessive feeding movement of the work, due to inertia, at the end of each printing operation.

*Type selecting mechanism.*—Referring to Figs. 2, 10, 11 and 12, the numeral 100 designates a plurality of spaced, parallel bars fixedly supported at their ends by cross members 101 carried by the casing 57. These bars serve as guides for a plurality of slides 102 to 108, inclusive, the slides having a tongue and groove engagement 109 with the guides so as to maintain them accurately in place but permitting them to have an independent longitudinal movement. The slides have fixed in their forward ends upwardly extending studs which are provided above the operating board with convenient handles 110 to 116, inclusive, by means of which movement may be imparted to each slide. Fixed on each of the studs is an index, or pointer, 117, these pointers being arranged to indicate on a plurality of dials 118 to 124, inclusive, respectively, the dials being secured in place by a plate 125 held by screws 126 against the top plate 127 of the operating board. Secured on the forward lower side of each of the slides 102 to 108, inclusive, is a downwardly extending plate 128 (Figs. 2 and 10) to which is pivotally attached a rod 129 connected at its other end by an adjustable means with the block, or clutch, 32, of the corresponding type supporting member, from which it will be understood that as each of the slides of the selective mechanism is moved longitudinally of its guides the corresponding type supporting member will be adjusted longitudinally on the periphery of the type carrier.

Referring to Fig. 4 the carrier will be seen to have on its periphery twelve of the type supporting members previously described. As the carrier is rotated in the direction indicated by the arrow, the first of these type supporting members 130 which is brought thereby into coöperation with the platen is provided with a row, or column, of type forms each adapted to print some conventional character as, for instance, a line of stars, to limit, or stop off, the printed amount, as is common in check writing machines. The succeeding type supporting member 131 has arranged in a single row, or column, two series of type forms, one comprising forms representing the words for expressing the amounts of the series 14 to 19, inclusive, and the other comprising forms representing the words expressing the multiples of 10 from 20 to 90, inclusive. The next succeeding type supporting member 132, bears a row of type forms representing words expressing the series of amounts from 1 to 9, inclusive, and also the series of amounts from 10 to 13, inclusive. The type supporting member 133 is provided with a row of type forms each representing the word "Thousand." The member 134 is provided with a row of type forms representing the words expressing the amounts of the series from 1 to 9, inclusive. The member 135 is provided with a row of type forms each representing the word "Hundred." The members 136 and 137 are duplicates of members 131 and 132, respectively. Member 138 bears a row of type forms each representing the word "Dollars." The members 139 and 140 are duplicates of the members 131 and 132, respectively. The member 141 bears a row of type forms each representing the word "Cents." The dials 118 to 124, inclusive, correspond, respectively, with type supporting members 131, 132, 134, 136, 137, 139 and 140, and it will be understood from the construction described that by the selective adjustment of any one of the handles 110 to 116, inclusive, the corresponding type supporting member may be moved independently of the other members longitudinally of the carrier to bring its selected type form into position for printing coöperation with the platen upon rotation of the type carrier.

The type supporting member 133, as previously stated, bears a row of type forms each representing the word "Thousand," and while but a single form of this kind might be used in printing all amounts involving the order of thousands, it is preferred to employ a plurality of such forms and to bring them selectively to printing position in order to distribute the wear. The means for shifting the type supporting member 133 comprises an arm 142 fixed to the clutch 32 of the type supporting member 131, and also an arm 143 fixed to the clutch of the member 132, each of these arms being adapted upon movement of its respective type supporting member from initial position to contact with a stud 144 fixed to the clutch of the type supporting member 133 so as to move this latter member to bring one of its forms to printing position when an amount in the order of thousands is to be printed. Thus the member 133 is moved a distance equal to that through which either of the members 131 or 132 is moved, or equal to the maximum extent of movement when both of the latter members are adjusted, so that the forms of the member 133 are brought variably to printing position. A spring 145 is fixed at one end to the stud 144 and at its other end to the support 25 (Fig. 7) so as to return the member 133 to initial position whenever the selective mechanism is cleared.

Similarly, the member 135 is adapted to be moved longitudinally to bring a different type form representing the word "Hundred" to printing position for each one of the type forms of the member 134 which is selected. The means for effecting this operation of the member 135 comprises, as before, an arm 146 fixed to the clutch 32 of the member 134 and adapted to engage a stud 147 on the clutch of the member 135, the latter being provided with a spring similar to that described for returning the member 135 to initial position. For the same purpose the clutches for shifting the members 139 and 140 are provided with arms 148 and 149, respectively, for engaging a stud 150 on the clutch corresponding to the member 141 for moving the latter against the tension of its spring to present its type forms representing the word "Cents" variably in printing position.

The type supporting member 138, as previously explained, bears a plurality of type forms each representing the word "Dollars," and, consequently, means is provided for moving this member to bring one of its type forms to printing position whenever any of the type forms used to designate a number of dollars is moved to printing position. This means comprises a lug 151 on the depending plate 128, previously described, of each of the slides of the selective mechanism corresponding to the dials 118 to 122, inclusive. Whenever these slides are moved to bring one of their type forms to printing position the lug 151 engages a crossbar 152 supported by the upper ends of a pair of arms 153 pivoted at their lower ends 154 on the base portion 20 of the frame (Fig. 2). Pivotally attached to the crossbar 152 is a link, or rod, 155, attached at its other end to the lug 32 of the clutch for the type supporting member 138. By this construction, whenever one of the type supporting members 131, 132, 134, 136 and 137 are shifted to bring one of their type forms to printing position the member 138 is also shifted, so that sometimes one type form of the latter and sometimes another is brought to printing position, thus distributing the wear of the forms. The spring 156 attached to the clutch for the member 138 and to the support 25 serves to urge the type member 138 back to initial position.

Each slide of the selective mechanism is provided with a depending bracket 157 to which is attached one end of a spring 158 (Fig. 2) having its other end attached to a crossrod 159 supported on the casing of the machine. This device serves to yieldingly hold the slides in initial position, and means is provided for retaining a slide in position after adjustment to select a type form comprising ratchet teeth 160 extending the length of the bar and adapted to be engaged by a pawl, or dog, 161, at the forward end of an arm 162 for each slide. The arms 162 are each pivotally supported on shaft 163 supported at its ends in the side walls of the casing, and each arm is urged upwardly to bring the dog into engagement with the ratchet teeth by means of a spring 164 attached to the arm and to the under side of one of the guide bars 100.

Means are provided for returning any one of the slides of the selective mechanism to initial position, after the printing operation, or, in case of error in selecting an amount, comprising a plunger 165 pivotally attached to each of the arms 162, the plungers projecting above the operating board (Fig. 1) so that they may be conveniently depressed to release the retaining device and permit the springs 158 to return each slide to initial position. A plunger 165$^a$ is also provided, having connection at its lower end with a bail-shaped member 166 extending across the machine, just above the arms 162, the ends of the bail being pivotally supported in the side walls of the casing. By depressing the plunger 165$^a$ each of the dogs 161 is lowered, permitting all of the slides to return to initial position and thus clearing the machine.

*Type inking means.*—The means for inking the type forms comprises a roller 167 extending axially of the carrier and so positioned as to come into rolling contact with the type forms previous to their engagement with the platen during the rotation of the carrier. The roller is provided with trunnions 168 journaled in the arms of a frame 169, which is provided with a drip cup 170, (Fig. 4). Frame 169 is pivotally supported by lugs 171 on the side of the casing 88 of the machine, and the spring 172 attached to the casing and to an arm of the frame 169 urges the inking roller into engagement with the type forms. An opening is provided in the casing 88 opposite the inking roller to permit access to the latter for cleaning and inking, and the opening is provided with a pivoted cover 173 (Fig. 4).

*The recording mechanism.*—The recording mechanism comprises a plurality of type wheels, one for each of the type selecting members, adapted to be adjusted by the selective movement of the latter for bringing a plurality of figure printing dies into position for printing upon a tape, or other suitable material, a record of the amount printed on each check. To this end the depending bracket 128 attached to each slide of the selective mechanism is provided with an extension 174 (Fig. 2) to which is pivotally attached a link 175, pivotally secured at its other end, 176, to an arm 177 of a sector gear 178 rotatably carried on the shaft 163. Each of the sector gears 178 meshes with one of a series of pinions 179 to 185, inclusive, rotatably carried on a shaft 186 supported at its ends in brackets 187 fixed on the outside pair of guide bars 100 (Fig. 12). The pinions 179 to 185, inclusive, serve to rotate through one half of a revolution the series of wheels 188 to 194, inclusive, respectively, these wheels corresponding to the type supporting members of the dials 118 to 124, respectively, of the selective mechanism. The pinions 180, 183 and 185 are rotatably carried on the hubs of the wheels 189, 192 and 194, respectively, and these wheels are each slidable a slight distance on the shaft 186 by a means later to be described. Pinion 179 and its associated wheel 188 are rotatably, but not slidably, carried by a sleeve 195 pinned to the shaft 186. The pinion 181 and its wheel 190, as also the pinion 182 and its wheel 191, are similarly supported on a sleeve 196, and pinion 181 is fixed to this wheel 190. Similarly, the pinion 184 and its wheel 193 are carried by a sleeve 197.

The pairs of wheels 188 and 189, 191 and 192, 193 and 194, are alike, so that it will only be necessary to describe one pair of these wheels, as, for instance, the wheels 193 and 194 with their associated pinions, as illustrated in Figs. 13 to 16. The pinion 185 mounted on the hub of the wheel 194 is integral with a flange 198 carrying a pin 199 moving in a slot 200 in the wheel 194, and the pin 199 extends through wheel 194 and into proximity with wheel 193. A spiral spring 201 connected at one end, 202, to the pinion 185, and at its other end, 203, to the wheel 194, tends to maintain the pin 199 at one end of the slot 200, as shown in Figs. 13 and 16. Wheel 194 is provided with a pair of pins 204 and 205 projecting toward the wheel 193, the latter pin being somewhat shorter than the former. The pins 199, 204 and 205 are adapted for coöperation with the wheel 193, as will presently appear.

The pinion 184 of the wheel 193 carries integral therewith a flange 206 and a spiral spring 207 attached at one end to the pinion and at the other end to the wheel serves to maintain a pin 208 on the flange at one end of a slot 209 in the wheel 193, similar to the construction described in the case of pinion 185 and wheel 194. Wheel 193 has thereon a pin 210 extending toward wheel 194, and pivoted on the wheel 193 at 211 is a latch 212 having a small movement about its pivot limited by a pin and slot device 213. A spring 214 normally holds the latch in its inward position so that a shoulder 215 on the inside of the latch is arranged to engage the pin 205 of the wheel 194, when the parts are in their initial position. It will be apparent that in this relation of the parts, when wheel 193 is rotated by its sector gear and pinion, it will rotate with it the wheel 194 until the latch 212, which is provided with a lug 216, is raised to release the latch and the pin 205. This release is effected by the engagement of the lug 216 on the latch with the end of the pin 199 carried by the pinion 185, and the arrangement of the parts is such that while the pin 199 engages the lug 216 for this purpose, it does not otherwise contact with the latch or other parts of wheel 193. During this operation the pinion 185 is held stationary by engagement with its sector gear, the wheel 194 being permitted to move relatively thereto by its slotted connection with the pin 199, but as soon as pin 205 is released by latch 212 in the manner described, the wheel 194 is returned by its spring 201 to initial position.

When wheel 194 is rotated by means of its pinion and sector gear, during the latter part of its movement, pin 204 comes into engagement with the pin 210 of the wheel 193, thereby moving wheel 193 with the wheel 194 until the latter reaches the end of its half revolution. During this operation pinion 184 remains stationary in engagement with its sector gear, permitting a movement of the wheel 193, as described, through the slotted engagement of the latter with the pin 208 of the pinion. In this manner, either of the wheels may be rotated positively by its pinion through one half of a revolution, and each wheel is adapted during a portion of its revolution to engage and move the other wheel for a purpose which will presently appear.

The housing of the recording wheels is provided in front of each wheel with a sight opening 217 (Fig. 2). Each of the wheels is provided with a group 218 of figure printing dies extending substantially over one half of its circumference, and also with a set 219 of indicating figures extending substantially over the other half of its circumference. The indicating figures are visible at the sight opening during adjustment of the wheels, and the figure printing die corresponding to any figure which is visible at the sight opening is diagonally opposite and in printing position at the back of the wheel. Thus, the recording wheels serve two purposes, and while the amount set up for printing may of course be read on the dials of the selective mechanism, it may be more quickly scanned from the indication in figures made by the printing wheels themselves.

The dial 124, and its corresponding type supporting member, bears two series of amounts, one from 1 to 9, inclusive, and the other from 10 to 13, inclusive. The recording wheel 194 is provided with a group of amounts indicated at 220 (Fig. 16) comprising a series from 1 to 9 inclusive, corresponding to the first-mentioned series on the dial, and comprising also a series from 0 to 3, corresponding to the series from 10 to 13 on the dial, the first mentioned series being preceded by two 0's corresponding to blank spaces on dial 124. The dial 123 bears a series of amounts from 14 to 19, inclusive, and also a series of amounts from 20 to 90, inclusive, and the recording wheel 193 bears a group of figures comprising an 0, a series of six 1's, and also the series 2 to 9, inclusive. Corresponding to the series 14 to 19 of dial 123, recording wheel 194 is provided at 221 with a group of figures comprising a zero and the series 4 to 9, inclusive.

When brought to printing position at the rear of the wheels the figure dies are adjacent a thin plate 222 provided with an opening opposite each wheel, as indicated at 223 and 224, through which opening the record tape is pressed by a platen in order to make a print from the die. Since the wheels 189, 192 and 194 carry the two groups of dies 220 and 221 previously described, it is desirable to provide means for shifting each of these wheels axially to bring either of the groups of dies to position opposite the printing opening. To this end the slide of the selective mechanism corresponding to each of these wheels, as in the case of the slide 124, is provided with a cam shoulder 225, and these shoulders are each adapted upon inward movement of the slides to engage and actuate a roller 226 carried by the end of a link 227 having a slotted engagement with a guide stud 228 fixed on the adjacent guide bar 100. Link 227 is pivoted at its other end 229 to a lever 230 pivotally supported by a stud 231 fixed in the adjacent guide bar. Each lever 230 carries at its rear end a pin 232 engaging in an annular recess 233 in the periphery of the wheel 194, and a spring 234 fixed at one end to one of the guide bars and at the other end to the lever 230, serves to hold the wheel 194 at the left extremity of its movement, as seen in Figs. 11 and 12. While the pointer 117 is being moved over the dial 124 from initial position to the figure 1, the cam shoulder on the slide actuates the device to shift wheel 194 to the right in Fig. 11 to bring the group of dies 220 to printing position, and the wheel remains in this position while any amount on this dial is being printed. As the pointer passes from the amount 9 to the amount 10, the pin 204, engaging the pin 210 of the wheel 193, rotates the latter wheel to place a figure 1 in printing position while the wheel 194 carries to printing position the figure 0, thereby printing the amount 10, and similarly for the other amounts of the series 10 to 13, inclusive. It is to be noted here that the pins 204 and 210 are sufficiently long to contact with each other although the wheel 194 has been shifted away from wheel 193.

When the pointer of dial 123 is moved to print one of the amounts 14 to 19, inclusive, wheel 193 is rotated to print the figure 1 in each instance, and the latch 212 on wheel 193 engaging the pin 205 on the wheel 194 rotates the latter to bring one of the figures 4 to 9, inclusive, of group 221 to printing position, thus, by means of the two wheels printing the amounts 14 to 19 inclusive. As the pointer of dial 123 is moved from 19 to 20, wheel 194 is released and returned to initial position in the manner described, and continued movement of this pointer brings figures 2 to 9, inclusive, of wheel 193 to position to print these figures in the tens place. The pointer of dial 124 may then be moved opposite one of the figures 1 to 9 for printing a unit's digit to be employed with a digit in the tens place printed by wheel 193.

The operation of the other similar pairs of recording wheels is the same, and the recording wheel corresponding to the dial 120 operates alone to print the amounts from 1 to 9, inclusive, for indicating the number of hundreds. It will be apparent from the range of amounts provided on the dials 118 and 119 for printing the number of thousands that the machine may be employed to print any amount, exact to the cent, less than one hundred thousand dollars, but the machine may be constructed to print any greater amount by an extension of the same principle.

The mechanism for effecting a printing impression from the figure dies comprises a spindle 236 (Fig. 2) supported at its ends in the side walls of the casing and carrying pivotally a frame 237 which has journaled in its lower ends a spindle 239 having fixed thereon a series of rollers 238 (Fig. 11) adapted to serve as platens for pressing the record tape through the openings in the plate 222 and into contact with the dies. The upper end of the frame is provided with slots 240 in which are supported the trunnions of a roller 241. The outer end of each of these trunnions has attached thereto a spring 242 which serves to urge the roll 241 into engagement with the platen rollers 238, and also to hold the frame rearwardly with the platen rollers out of engagement with the figure dies. The frame 237 is provided with a rearward extension 243 adapted to be engaged by a lever 244 pivoted on the frame 23 and having its upper end in position to contact with a cam projection 245 carried on the outer forward edge of the ring 36. Thus during each printing rotation of the carrier the lever 244 is actuated by the cam 245 to swing the frame 237 about its pivot and thus bring the platen wheels into contact with the figure dies in printing position opposite the apertures in the plate 222.

The plate 222 (Figs. 2 and 11) is provided with ribs 246 inclosing and guiding an inking ribbon 247 which thus lies between the record tape and the dies, so as to ink the tape, and the ribbon is wound at its ends about spools 248 and 249 which are adapted to be turned by any convenient mechanism actuated by each printing movement of the mechanism so as to feed the ribbon slowly across the dies.

Rotatably carried in a frame 250 mounted on top of the casing 88 of the machine is a roll of tape 251. The end of the tape is adapted to be carried downwardly at the front of the roll through a slot 252 in the casing, around the platen rolls and up and back between the latter and the roll 241, and thence through the slot 252 out of the machine and over a serrated flange 253 by means of which portions of the tape may be detached. The spindle 239, which carries the platen rolls, is provided at its right hand end, as seen in Fig. 11, with a ratchet wheel 254 with which is adapted to engage a pawl 255 pivotally supported on the side wall of the casing and urged by a spring 256 into engagement with the ratchet. The inclination of the teeth of the ratchet is such that when the platen rolls are moved to press the paper against the inking ribbon over the printing dies, the pawl 255 slips over one or more teeth and on the return of the platen rolls to initial position the pawl rotates the rolls a distance sufficient to feed the paper and present a clean line for the next printing impression of the dies.

The operation of the machine is suggested by the description of its construction, and will require but a brief explanation. The guard plate 91 having been raised by depressing the finger piece 95, the check is inserted in the slot 87 at the right side of the machine between the guides 90 until the lefthand end of the line of the check upon which the impression is to be made is above the platen wheel. The guard plate 91 is then released to hold the check on the printing bed. The pointers of the selective mechanism are adjusted over their respective dials, thus bringing into alinement in printing position on the carrier, the proper type forms for printing in words the amount of the check, and at the same time setting the printing wheels of the recording mechanism into position to make a printed record of the same amount in figures. The motor having been started by means of the push buttons 56, the controlling plunger 66 is depressed, thus clutching the actuating gearing to the type carrier and rotating the latter through a complete revolution. During this revolution of the type carrier the type forms which have been placed in printing position come successively into rolling engagement with the platen and simultaneously print and feed the work therebetween. At the same time a record is printed on the tape in convenient form, and the tape is fed forward ready for the next record. The guard may then be raised to remove the check from the left side of the machine. Any number of checks may then be printed for the same amount, if so desired, by simply locating each check in the machine in the manner described and depressing the plunger 66. When it is desired to print a different amount the various pointers of the selective mechanism may be returned to initial position on their respective dials by depressing the button 165ᵃ on the operating board, thus preparing the machine for the selection of a different amount.

Having thus described my invention, what I claim as new, and desire to secure by Letters Patent is:—

1. In a printing apparatus, a plurality of type supporting members arranged for rotation about a common axis, each member having a row of type forms extending parallel with said axis with the forms of each row extending transversely thereof; manipulative means separate from said members and adapted to coöperate with said members in one position of the latter for moving said members independently of each other and parallel with said axis to bring the type forms of each row selectively to a common printing line; means for rotating said members about said axis to bring the selected type forms successively into engagement with the work to print and feed the work; and stationary means adapted to engage said members for maintaining them in adjusted position during said rotation.

2. In a check writing machine, a support, a carrier rotatably mounted on said support and having thereon a plurality of type supporting members each provided with a plurality of circumferentially extending type forms; an adjustable clutch part on said support for each member, said clutch part and member having interengaging devices for adjusting said member longitudinally when said part is adjusted to bring said forms selectively to printing position, said devices being adapted for disengagement by the rotation of said carrier; means for imparting a rotary printing movement to said carrier; and devices on said support for engaging said devices on the members upon rotation of the carrier for retaining said members in adjusted position while out of engagement with the clutch parts during said rotary printing movement of the carrier.

3. In a printing apparatus, a support; a rotary platen on said support; a carrier rotatably mounted on said support; a plurality of type supporting members on the carrier, each having a plurality of type forms and being adjustable to bring said forms selectively to position for successive coöperation with said platen during rotation of the carrier; selecting mechanism for effecting said selective adjustment of the type members in one position of said carrier; and coacting parts on said type members and support adapted for engagement with each other during the rotation of the carrier to maintain the type members in adjusted position.

4. In a printing apparatus, a support; a carrier on said support having a plurality of type supporting members each adjustable to bring its type forms selectively to a common printing line; a platen on the support, said carrier having a printing movement to bring the selected type forms into coöperation therewith; a type selecting mechanism on said support, including a plurality of adjustable parts, one for each of said members, adapted to be connected with their respective members in one position of said carrier, for selectively adjusting said members, and to be disconnected from said members during said printing movement of the carrier; and operating means for effecting said printing movement of the carrier.

5. In a printing apparatus, a support; a carrier on said support having a plurality of type supporting members each adjustable to bring its type forms selectively to a common printing line; a platen on the support, said carrier having a printing movement to bring the selected type forms into coöperation therewith; a type selecting mechanism on said support, including a plurality of adjustable parts, one for each of said members, adapted to be connected with their respective members in one position of said carrier, for selectively adjusting said members, and to be disconnected from said members during said printing movement of the carrier; retaining means on said support for retaining said members in adjusted position during the printing movement of the carrier; and operating means for effecting said printing movement of the carrier.

6. In a printing apparatus, a support; a carrier on said support having a plurality of type supporting members each adjustable to bring its type forms selectively to a common printing line; a rotary platen on the support, said carrier having a printing movement to bring the selected type forms into rolling coöperation with the platen to print and feed the work; a type selecting mechanism on said support including a plurality of adjustable parts, one for each of said members, adapted to be connected with their respective members in one position of said carrier, for selectively adjusting said members, and to be disconnected from said members during said printing movement of the carrier; and operating means for effecting said printing movement of the carrier.

7. In a printing apparatus, a support; a plurality of type supporting members on said support arranged for rotation about a common axis, each member having a plurality of circumferentially extending type forms and being adjustable to bring its type forms, selectively, to a common printing line; a rotary platen on the support for coöperation with the selected type forms during the rotation of said members; a type selecting mechanism on said support including a plurality of adjustable parts; one for each of said members, adapted to be connected with their respective members in one position of said carrier, for selectively adjusting said members, and to be disconnected from said members during the rotation thereof; and operating means for rotating said members.

8. In a printing apparatus, a support; a plurality of type supporting members on said support arranged for rotation about a common axis, each member having a plurality of circumferentially extending type forms and being adjustable to bring its type forms, selectively, to a common printing line; a rotary platen on the support for coöperation with the selected type forms during the rotation of said members; a type selecting mechanism on said support including a plurality of adjustable parts, one for each of said members, adapted to be connected with their respective members in one position of said carrier, for selectively adjusting said members, and to be disconnected from said members during the rotation thereof; retaining means on the support for retaining said members in adjusted position during the rotation thereof; and operating means for effecting the rotation of said members.

9. In a printing apparatus, a carrier provided with a plurality of elongated guideways; a plurality of type bars slidable in said guideways and each having a plurality of transversely extending type forms adapted to be selectively brought to a common printing line by the sliding movement of the bar; a platen, said carrier having a printing movement to bring the selected forms into coöperation with said platen; and stationary selective mechanism adapted to be connected with said bars in one position of said carrier to effect said selective movement of the bars, and to be disconnected from said bars during the printing movement of the carrier.

10. In a printing apparatus, a support; a carrier on said support provided with a plurality of elongated guideways; a plurality of type bars slidable in said guideways and each having a plurality of transversely extending type forms adapted to be selectively brought to a common printing line by the sliding movement of the bar; a rotary platen on said support, said carrier having a printing movement to bring the selected forms into rolling coöperation with said platen to print and feed the work; and selective mechanism on said support adapted to be connected with said bars in one position of said carrier, and to be disconnected therefrom during said printing movement of the carrier.

11. In a printing apparatus, a support; a carrier on said support provided with a plurality of elongated guideways; a plurality of type bars slidable in said guideways and each having a plurality of transversely extending type forms adapted to be selectively brought to a common printing line by the sliding movement of the bar; a rotary platen on said support, said carrier having a rotary movement to bring the selected type forms into coöperation with said platen; and type selecting mechanism on said support adapted to be connected with said bars in one position of said carrier to effect said selective movement of the bars, and to be disconnected from said bars during said rotary movement of the carrier.

12. In a printing apparatus, a fixed support; a carrier on said support having a plurality of type supporting members each adjustable to bring its type forms selectively to a common printing line; a platen on the support, said carrier having a printing movement relative to the support, to bring the selected type forms into coöperation with the platen; a keyboard fixed on said support, having a plurality of manipulative means for effecting said selective adjustment of the type members; and operating means for effecting said printing movement of the carrier.

13. In a printing apparatus, a fixed support; a rotatable carrier on said support having a plurality of type supporting members, each adjustable to bring its type forms selectively to a common printing line; a rotary platen on the support, said carrier having a printing movement relative to the support to bring the selected type forms into rolling coöperation with the platen to print and feed the work; a keyboard fixed on said support, having a plurality of manipulative means movable relative to the rotatable carrier for effecting said selective adjustment of the type members; and operating means for effecting said printing movement of the carrier.

14. In a printing apparatus, a plurality of type supporting members, each provided with a row of type forms; means, comprising a stationary dial and a coöperating index, for moving each member independently to bring the type forms of said row selectively to printing position; and means for moving said members to bring the selected type forms successively into engagement with the work to print and feed the work.

15. In a printing apparatus, a plurality of type supporting members arranged for rotation about a common axis and each provided with a row of type forms; means, comprising a stationary dial and a coöperating index, for moving each member independently to bring the type forms of said row selectively to printing position; and means for rotating said members to bring the selected type forms successively into engagement with the work to print and feed the work.

16. In a printing apparatus, a plurality of type supporting members each provided with a row of type forms; means, comprising a dial and an index, one of which is stationary, coöperating with each of said members in one position of the latter for adjusting each member independently to bring the type forms of said row selectively to printing position; means for moving said members to bring the selected type forms successively into engagement with the work to print and feed the work; and means for retaining said members in adjusted position during said printing movement.

17. In a printing apparatus, a carrier having thereon a type supporting member provided with a row of type forms; a second type supporting member on the carrier also provided with a row of type forms, said members being movable to bring the type forms of each row selectively to printing position; manipulative means for effecting said selective movement of the first mentioned member; means for automatically moving said second member selectively by said selective movement of the first member, a rotary platen for coöperation with the selected type forms; and operating means for moving the selected type forms transversely of said rows in engagement with the work to print and feed the latter.

18. In a printing apparatus, a carrier having thereon a plurality of type supporting members each provided with a row of type forms; a complementary type supporting member on said carrier also provided with a row of type forms, all of the members being movable to bring the forms of each row selectively to printing position; manipulative means for imparting to each of said plurality of members an independent selective movement; means for automatically imparting a selective movement to said complementary member by said selective movement of each of said plurality of members; a rotary platen for coöperation with the selected forms; and operating means for moving the selected forms transversely of the rows in engagement with the work to print and feed the latter.

19. In a printing apparatus, a plurality of type supporting members each provided with a plurality of type forms and being movable independently to bring its forms selectively to printing position; a type selecting mechanism carried by a stationary support and comprising a plurality of devices, one for each of said members, adapted to be manipulated for effecting said selective movement of the members and for indicating the type forms selected; and means for moving said members to bring said selected type forms into printing engagement with the work.

20. In a printing apparatus, a plurality of type supporting members each provided with a plurality of type forms and being movable independently to bring its forms selectively to printing position; a type selecting mechanism carried by a stationary support and comprising a plurality of devices, one for each of said members, adapted to be manipulated for effecting said selective movement of the members and for indicating the type forms selected; and means for moving said members simultaneously to bring said selected type forms successively into printing engagement with the work.

21. In a printing apparatus, a carrier having thereon a plurality of rows of type forms, each of said rows being independently movable to bring its forms selectively to printing position; a type selecting mechanism carried by a stationary support and comprising a plurality of devices, one for each of said members, adapted to be manipulated for effecting said selective movement of the members and for indicating the type forms selected; and means for moving said carrier to bring said selected type forms successively into printing engagement with the work.

22. In a printing apparatus, a rotary carrier having a plurality of rows of type forms, each of said rows being independently movable to bring its forms selectively to printing position; a type selecting mechanism carried by a stationary support and comprising a plurality of devices, one for each of said members, adapted to be manipulated for effecting said selective movement of the members and for indicating the type forms selected; and means for rotating said carrier to bring the selected type forms successively into rolling engagement with the work to print and feed the work.

23. In a printing apparatus, a plurality of type supporting members each provided with a plurality of type forms and being movable independently to bring its forms selectively to printing position; a type selecting mechanism for each of said members comprising a stationary dial bearing markings corresponding to the type forms of the respective member, and a pointer movable over said dial for effecting said selective movement of the member and indicating the type form selected, and means for moving said members to bring the selected type forms into printing engagement with the work.

24. In a printing apparatus, a plurality of type supporting members each provided with a plurality of type forms and being movable independently to bring its forms selectively to printing position; a plurality of devices, one for each of said members, adapted to be manipulated for effecting said selective movement of the members and for indicating the type forms selected; means for automatically restoring one or more of said members to initial position; a rotary platen; and means for moving said members simultaneously to bring the selected type forms successively into rolling coaction with the platen to print and feed the work.

25. In a printing apparatus, a plurality of type forms adapted to be brought selectively to printing position; a rotary platen; said selected forms and platen being relatively movable into successive rolling engagement to print and feed the work; a combined guard and presser foot normally bearing upon the work and having an opening, said platen being movable relatively to said guard to project the work through said opening, and said guard having a subsequent movement in unison with said platen to permit the work to be moved into engagement with the type forms and to strip the work therefrom as the platen is retracted; and means for adjusting said guard to permit the insertion and removal of the work.

26. The combination with a printing apparatus comprising a carrier having a plurality of type forms movable selectively to printing position, said forms representing words adapted to be combined for writing any monetary value within certain limits; and a rotary platen, said carrier having a printing movement to bring the selected forms into rolling coaction with the platen to print and feed the work; of recording mechanism adapted to automatically print a record of each of said values expressed in figures.

27. The combination with a printing apparatus comprising a carrier having a plurality of type forms movable selectively to printing position, and representing words adapted to be combined for writing any monetary value within certain limits; and a rotary platen, said carrier having a printing movement to bring the selected forms into rolling coaction with the platen to print and feed the work; of recording mechanism adapted for automatically marking upon suitable material a record expressed in figures of each value printed by said type forms.

28. The combination with a printing apparatus comprising a plurality of type forms movable selectively to printing position, and representing words adapted to be combined for writing any monetary value within certain limits; and a rotary platen, said carrier having a printing movement to bring the selected forms into rolling coaction with the platen to print and feed the work; of automatic recording mechanism comprising a plurality of figure printing dies movable selectively to printing position by said selective movement of the type forms, an impression member, said member and selected dies having a relative impressing movement, and suitable material adapted to be fed between said printing couple for receiving therefrom a recording impression of each value printed by said apparatus.

29. The combination with a printing apparatus comprising a plurality of type forms movable selectively to printing position, and representing words adapted to be combined for writing any monetary value within certain limits; and a rotary platen, said carrier having a printing movement to bring the selected forms into rolling coaction with the platen to print and feed the work; of automatic recording mechanism comprising a plurality of wheels each bearing a series of figure printing dies and movable to bring said dies selectively to printing position by said selective movement of the type forms, an impression member, said member and wheels having a relative impressing movement imparted by the operation of said printing apparatus, and a record tape adapted to be fed between said member and wheels and to have impressed thereon a record of each value printed by said apparatus.

30. The combination with a printing apparatus comprising a plurality of type forms arranged in groups and representing words adapted to be combined for writing any monetary value within certain limits, each of said groups being independently movable to bring its forms selectively to printing postion; and a rotary platen, said type forms and platen being adapted to coöperate with a rolling, printing and feeding form of action; of a recording mechanism comprising a plurality of figure printing die carriers each movable to bring its dies selectively to printing position; and a common selective mechanism coöperating with said printing apparatus and with said recording mechanism to adjust said type forms and die carriers to write and record the same value.

31. In a printing apparatus, a type supporting member provided with a plurality of type forms representing words expressing various amounts composing two series of different orders; two carriers provided with dies for printing said amounts in figures, one of said carriers having its dies arranged in two groups; and means for moving said member to bring said type forms selectively to printing position, operating also to move said last mentioned carrier to place one of said groups of dies in operative position, and to bring the corresponding die of said group to printing position when an amount of one of said series is selected, and for moving both of said carriers to bring the corresponding dies to printing position when an amount of the other series is selected.

32. In a printing apparatus, a type supporting member provided with a plurality of type forms representing words expressing various amounts composing two series of different orders; two carriers provided with dies for printing said amounts in figures; and means for moving said member to bring said type forms selectively to printing position, operating also to move both of said carriers to bring the corresponding dies to printing position when an amount of one of said series is selected and for releasing one of said carriers to permit its return to initial position when an amount of the other series is selected.

33. In a printing apparatus, a type supporting member provided with a plurality of type forms representing words expressing various amounts composing two series of different orders, said member being movable to bring said forms selectively to printing position; two carriers provided with dies for printing said amounts in figures, one of said carriers being connected with said member to be moved therewith to bring the corresponding figure die to printing position when a type form of one of said series is selected; spring means for yieldingly holding the other carrier in initial position; and means for moving said latter carrier against the action of said spring to bring its dies selectively to printing position in combination with the dies of said other carrier when said member is moved to select a type form of the other series.

34. In a machine of the class described, the combination with a key board, of an element rotatable relative to the key board, type carriers adjustable on said element to set up items at a printing line extending circumferentially of the element, connections for adjusting the type carriers by manipulation of the key board, operating means for rotating the rotatable element relative to the key board and a platen coöperating with the type at the aforesaid printing line.

35. In a machine of the class described, the combination with a set of manipulative devices, of an element rotatable relative to the manipulative devices, carriers adjustable on said element to set up items at a printing line extending circumferentially of the element, connections whereby the type carriers may be adjusted by manipulation of the manipulative devices, operating means for rotating the rotatable element relative to the key board and a platen for taking impressions from the type during rotation of said element.

36. In a machine of the class described, a pair of differentially adjustable type carriers, manipulative means associated with each type carrier and means whereby each manipulative means will differentially adjust its peculiar type carrier in printing certain amounts or either manipulative means will adjust both type carriers in printing other amounts.

37. In a machine of the class described, the combination with a pair of rotatable digit type carriers, of a manually adjustable slide for each type carrier, and means whereby either slide will rotate its peculiar carrier in printing certain amounts or either slide will rotate both carriers in printing other amounts.

ARTHUR C. LA MAY.

Witness:
F. P. RINHART.